United States Patent

Lu et al.

[11] Patent Number: 5,720,708
[45] Date of Patent: Feb. 24, 1998

[54] HIGH FRAME RATE IMAGING WITH LIMITED DIFFRACTION BEAMS

[75] Inventors: Jian-yu Lu; James F. Greenleaf, both of Rochester, Minn.

[73] Assignee: Mayo Foundation for Medical Education and Research, Rochester, Minn.

[21] Appl. No.: 785,030

[22] Filed: Jan. 2, 1997

[51] Int. Cl.$^6$ .................................................. A61B 8/00
[52] U.S. Cl. .................................................. 600/447
[58] Field of Search ................... 600/407, 437, 600/444, 447; 367/7, 11, 138; 378/4, 12, 14; 73/602, 603, 607; 382/260, 266, 276; 364/604, 827

[56] References Cited

U.S. PATENT DOCUMENTS

| | | | |
|---|---|---|---|
| 5,305,752 | 4/1994 | Spivey et al. | 128/661.02 |
| 5,307,264 | 4/1994 | Waggener et al. | 378/14 |
| 5,608,690 | 3/1997 | Hossack et al. | 367/138 |

OTHER PUBLICATIONS

Producing Bowtie Limited Diffraction Beams with Synthetic Array Experiments, IEEE Transactions on Ultrasonics, Ferroelectircs and Frequency Control, vol. 43, No. 5, pp. 1–9, Sep. 1996, Jian-yu Lu.

Construction of Limited Diffraction Beams with Bessel Bases, 1995 IEEE Ultrasonics Symposium, pp. 1393–1397, Jian-yu Lu.

Biomedical Ultrasound Beam Forming, Ultrasound in Med. & Bio., vol. 20, No. 5, pp. 403–428, 1994, Jian-yu Lu, et al.

Nondiffracting X Waves–Exact Solutions to Free–Space Scalar Wave Equation and Their Finite Aperture Realizations, IEEE Transactions on Ultrasonics, Ferroelectircs and Frequency Control, vol. 39, No. 1, Jan. 1992, Jian–yu Lu et al.

Diffraction–limited Beams and Their Applications for Ultrasonic Imaging an Tissue Characterization, SPIE vol. 1733 (1992), pp. 92–119, Jian-yu Lu, et al.

Experimental Verification of Nondiffracting X Waves, IEEE Transactions on Ultrasonics, Ferroelectircs and Frequency Control, vol. 39, No. 3, pp. 441–446, May 1992, Jian-yu Lu, et al.

Reflection Mode Diffraction Tomography, Ultrasonic Imaging 7, 300–320 (1985), Roberts, et al.

System Analysis of Ultrasound Reflection Mode Computerized Tomography, IEEE Transactions on Sonics and Ultrasonics, vol. SU–31, No. 4, Jul. 1994, Hiller et al.

Ultrasonic Reflectivity Imaging In Three Dimensions: Exact Inverse Scattering Solutions for Plane, Cylindrical, and Spherical Apertures, IEEE Transactions on Biomedical Engineering, vol. BME–28, No. 2, Feb. 1981, Norton et al.

*Primary Examiner*—George Manuel
*Attorney, Agent, or Firm*—Quarles & Brady

[57] ABSTRACT

An ultrasonic imaging system includes a 2D transducer array which transmits ultrasonic energy at an object to be imaged. The echo signals received at the separate transducer elements are weighted to produce limited diffraction beams and the weighted signals are Fourier transformed to produce a 3D k-space data array. A 3D image is produced by performing an inverse fast Fourier transform on the k-space data array.

16 Claims, 3 Drawing Sheets

FIG. 2A

3D VIEW

FIG. 2B $k_a < k_b < k_c$

IN $k_x, k'_z$ PLANE

FIG. 3

HIGH FRAME RATE IMAGING WITH LIMITED DIFFRACTION BEAMS

BACKGROUND OF THE INVENTION

The field of the invention is coherent imaging using vibratory energy, such as ultrasound and, in particular, 2D and 3D ultrasound imaging using limited diffraction beams.

There are a number of modes in which ultrasound can be used to produce images of objects. The ultrasound transmitter may be placed on one side of the object and the sound transmitted through the object to the ultrasound receiver placed on the other side ("transmission mode"). In the alternative, the receiver may be positioned on the same side of the object as the transmitter and an image may be produced in which the brightness of each pixel is a function of the amplitude of the ultrasound reflected from the object back to the receiver ("backscatter" or "echo" mode). The present invention relates to a backscatter method for producing ultrasound images.

There are a number of well known backscatter methods for acquiring ultrasound data. In the so-called "A-scan" method, an ultrasound pulse is directed into the object by the transducer and the amplitude of the reflected sound is recorded over a period of time. The amplitude of the echo signal is proportional to the scattering strength of the reflectors in the object and the time delay is proportional to the range of the reflectors from the transducer. In the so-called "B-scan" method, the transducer transmits a series of ultrasonic pulses as it is scanned across the object along a single axis of motion. The resulting echo signals are recorded as with the A-scan method and their amplitude is used to modulate the brightness of pixels on a display. With the B-scan method, enough data are acquired from the series of pulse transmission to reconstruct an image of the reflectors disposed in a plane extending away from the transducer.

In the so-called C-scan method, the transducer is scanned across a plane above the object and only the echoes reflecting from the focal depth of the transducer are recorded. The sweep of the electron beam of a CRT display is synchronized to the scanning of the transducer so that the x and y coordinates of the transducer correspond to the x and y coordinates of the CRT image. Enough data are acquired from the series of pulse transmissions to reconstruct an image of the reflectors disposed in a plane at the transducer's focal depth.

Ultrasonic transducers for medical applications are constructed from one or more piezoelectric elements sandwiched between a pair of electrodes. Such piezoelectric elements are typically constructed of lead zirconate titanate (PZT), polyvinylidene diflouride (PVDF), or PZT ceramic/polymer composite. The electrodes are connected to a voltage source, and when a voltage is applied, the piezoelectric elements change in size at a frequency corresponding to that of the applied voltage. When a voltage pulse is applied, the piezoelectric element emits an ultrasonic wave into the media to which it is coupled at the frequencies contained in the excitation pulse. Conversely, when an ultrasonic wave strikes the piezoelectric element, the element produces a corresponding voltage across its electrodes. Typically, the front of the element is covered with an acoustic matching layer that improves the coupling with the media in which the ultrasonic waves propagate. In addition, a backing material is disposed to the rear of the piezoelectric element to absorb ultrasonic waves that emerge from the back side of the element so that they do not interfere. A number of such ultrasonic transducer constructions are disclosed in U.S. Pat. Nos. 4,217,684; 4,425,525; 4,441,503; 4,470,305 and 4,569,231.

When used to perform the A-scan, B-scan or C-scan described above, the ultrasonic transducer may take the form of a single element which is physically moved to scan the field of view as the series of ultrasonic pulses are produced and echoes are received. In most current designs, however, the transducer typically has a number of piezoelectric elements arranged in an array and driven with separate voltages (apodizing). By controlling the time delay (or phase) and amplitude of the applied voltages, the ultrasonic waves produced by the piezoelectric elements (transmission mode) combine to produce a net ultrasonic wave focused at a selected point. By controlling the time delay and amplitude of the applied voltages, this focal point can be electronically "steered" to scan in a plane throughout the field of view.

The same principles apply when the transducer is employed to receive the reflected sound (receiver mode). That is, the voltages produced at the separate transducer elements in the array are summed together such that the net signal is indicative of the sound reflected from a single focal point in the subject. As with the transmission mode, this focused reception of the ultrasonic energy is achieved by imparting separate time delay (and/or phase shifts) and gains to the signal from each transducer array element.

This form of ultrasonic imaging is referred to as "phased array sector scanning", or "PASS". Such a scan is comprised of a series of measurements in which the steered ultrasonic wave is transmitted, the system switches to receive mode after a short time interval, and the reflected ultrasonic wave is received and stored. Typically, the transmission and reception are steered in the same direction ($\theta$) during each measurement cycle to acquire data from a series of points along a scan line. The receiver is dynamically focused at a succession of ranges (R) along the scan line as the reflected ultrasonic wave is received.

The time required to conduct a scan with a PASS system is a function of the time required to make each pulse/echo measurement and the number of measurements required to cover the entire field of view at the desired resolution and signal-to-noise ratio. For example, a total of 128 scan lines may be acquired over a 90 degree sector, with each pulse/echo measurement being steered in increments of 0.70°. Such a scan might require more than 30 ms. to produce enough data to reconstruct a single image frame. A number of such PASS ultrasonic imaging systems are disclosed in U.S. Pat. Nos. 4,155,258; 4,155,260; 4,154,113; 4,155,259; 4,180,790; 4,470,303; 4,662,223; 4,669,314 and 4,809,184.

Conventional ultrasonic transducers employed in PASS systems focus the wave providing very high resolution images of objects lying at or near the focal plane. However, objects which are not at this focal plane are out of focus and their resolution in the reconstructed image is reduced. Such transducers are said to have high resolution, but low "depth of field".

Nondiffracting solutions to the wave equation have been discovered and extensively tested using electromagnetic waves and ultrasonic waves. Under ideal conditions, these solutions indicate that transducers can produce a wave that is confined to a beam that does not diffract, or spread, over a long distance. Such nondiffractive beams produce a much greater depth of field than conventional focused beams. In practice, such beams do eventually diffract due to the less-than-ideal transducers and propagating media, and the phrase "limited diffraction beams" has been coined for this class of beams.

In U.S. Pat. No. 5,081,995, an ultrasonic transducer is described which produces one well-known type of limited diffraction beam, which was first discovered by J. A. Stratton in a book entitled "Electromagnetic Theory", published in 1941 by McGraw-Hill Book Company (pg. 356). J. Durnin performed experimental work in optics using such beams, as described in an article entitled "Exact Solutions for Nondiffracting Beams. I. The Scalar Theory", published in the *Journal of Optical Society of America*, 4(4):651–654 in April, 1987. This limited diffraction beam is referred to as a "Bessel beam" because its lateral beam profile is a Bessel function.

More recently, another type of limited diffraction beam was discovered by J-y. Lu and J. Greenleaf and described in an article "Nondiffracting X waves—exact solutions to free-space scalar wave equation and their finite aperture realizations", *IEEE Trans. Ultrason. Ferroelec., Freq. Contr.*, Vol. 39, pp. 19–31, January 1992. This beam has an x-like shape in a plane along the wave axis and it has been termed "X waves". The X waves are nonspreading in both transverse and axial directions and have a large depth of field even when they are produced by a transducer of finite aperture.

Because prior imaging systems require many pulse/echo measurements to acquire sufficient data to reconstruct an image, the rate at which they can produce each image frame is limited. If higher frame rates can be achieved, there is less blurring of the image due to motion of the subject. This is particularly important when imaging the beating heart.

SUMMARY OF THE INVENTION

The present invention relates to an ultrasonic imaging system for producing images of an object at a high frame rate. More specifically, the invention includes transmitting a pulse of ultrasonic energy directed toward the object, receiving the echo signals from the object and weighting them to form a limited diffraction beam, Fourier transforming the weighted echo signals to form a multi-dimensional k-space data array; and producing an image by inverse Fourier transforming the k-space data array along each of its dimensions.

A general object of the invention is to construct an image from echo signals produced in response to a single ultrasonic pulse and its associated echo measurements. By receiving a limited diffraction beam, sufficient data are acquired in a single pulse transmission to substantially fill a k-space (i.e. spatial Fourier space) data array from which an image can be reconstructed by a multi-dimensional inverse Fourier transformation.

Another object of the invention is to produce images at a high frame rate. A complete 2D or 3D image can be reconstructed from echo signals produced by a single pulse transmission. The frame rate is not limited by the time needed to produce multiple, steered, transmit and receive beams normally required to produce an image. Very substantial increases in frame rate are achievable with both 2D and 3D images.

Another object of the invention is to reduce the cost of the imaging system. Steered transmit or receive beams are not required to practice the present invention. This results in a substantial reduction in the amount of computations that must be performed and it results in a substantial consequent reduction in the amount of hardware typically required to produce 2D and 3D ultrasound images. The image reconstruction uses Fourier transformation circuits which are commercially available at reasonable cost due to the many applications of these circuits in a variety of other fields.

Yet another object of the invention is to improve image quality. Because data for a complete image can be acquired quickly and efficiently, multiple acquisitions can be made and averaged, or otherwise combined either coherently or incoherently using known methods. This results in an increase in the signal-to-noise ratio and an improvement in the quality of the reconstructed image.

Yet another object of the invention is to increase image resolution and reduce sidelobes. This may be achieved by also transmitting the pulse of ultrasonic energy as a limited diffraction beam. In the preferred embodiment a plane wave is transmitted by energizing all of the transducer array elements with the same signal pulse. If the transmit signals applied to each transducer element are weighted to produce limited diffraction beams, the resolution of the resulting image is improved, and artifacts caused by sidelobes are reduced.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

GENERAL DESCRIPTION OF THE INVENTION

In this section, 2D and 3D image construction formulas for a pulse-echo ultrasound system will be derived using limited diffraction beams.

As described in the above-cited article on non-diffracting X waves, the equation for such a wave may be expressed as follows:

$$\Phi_{X_n}(\vec{r},t) = \Phi_{X_n}(r,\phi,z - c_1 t) = \tag{1}$$

$$e^{in\phi} \int_0^\infty B(k) J_n(kr \sin\zeta) e^{-ik\cos\zeta(z-c_1 t)} dk, \ (n = 0,1,2,\ldots)$$

where $\vec{r} = (r,\phi,z)$ represents a spatial point in the cylindrical coordinates, t is time, r is radial distance, $\phi$ is polar angle, z is the axial distance, $c_1 = c/\cos\zeta$ is the phase velocity of X waves, $k = \omega/c$ is the wave number, $\omega = 2\pi f$ is the angular frequency, f is the temporal frequency, c is the speed of sound, $\zeta (0 \leq \zeta < \pi/2)$ is the Axicon angle of X waves, $J_n(\bullet)$ is the nth-order Bessel function of the first kind, B(k) is any well behaved function that could represent the transfer function of a practical acoustic transducer, and $a_0$ is a constant that determines the fall-off speed of the high-frequency components of X waves and n is termed the "order" of the waves.

With an infinite aperture, X waves can propagate to infinite distance without changing their wave shapes. If the aperture is finite, these waves have a large depth of field. For example, if the diameter of the aperture is D, the depth of field of the waves is given by the following:

$$Z_{max} = \frac{D}{2} \frac{1}{\sqrt{\left(\frac{c_1}{c}\right)^2 - 1}} = \frac{D}{2} \cot\zeta. \quad (2)$$

If D=50 mm and $\zeta$=6.6°, the depth of field is about 216 mm (the depth of field is defined as the axial distance from the surface of transducer where the peak pressure of the wave drops to −6–dB of that at the surface).

Summing the X waves in Equation (1) over the index, n, broadband limited diffraction array beams are obtained that are still limited diffraction solutions to the isotropic-homogeneous wave equation $$\Phi_{Array}(\vec{r},t) = \sum_{n=-\infty}^{\infty} i^n e^{-in\theta} \Phi_{X_n}(r,\phi,z-c_1t) = \quad (3)$$

$$\int_0^\infty B(k) \left[ \sum_{n=-\infty}^{\infty} i^n J_n(kr \sin\zeta) e^{in(\phi-\theta)} \right] e^{-ik\omega - i\cos\zeta(z-c_1t)} dk,$$

where $0 \leq \theta < 2\pi$ is a free parameter and the subscript "Array" represents "array beams". Because of the following equality, $$\sum_{n=-\infty}^{\infty} i^n J_n(kr \sin\zeta) e^{in(\phi-\theta)} = e^{i(kr\sin\zeta)\cos(\phi-\theta)}, \quad (4)$$

the array beams can be written as:

$$\Phi_{Array}(\vec{r},t) = \frac{1}{2\pi} \int_0^\infty T(k) e^{ik_x x + ik_y y + ik_z z} e^{-i\omega t} dk = \quad (5)$$

$$\frac{1}{2\pi} \int_{-\infty}^\infty T(k) H(k) e^{ik_x x + ik_y y + ik_z z} e^{-i\omega t} dk,$$

where $$\frac{T(k)H(k)}{c} e^{ik_x x + ik_y y + ik_z z}, \quad (6)$$

is the Fourier transform (spectrum) of the array beams in terms of time, $$H\left(\frac{\omega}{c}\right) = \begin{cases} 1, & \omega \geq 0 \\ 0, & \omega < 0 \end{cases} \quad (7)$$

is the Heaviside step function, $T(k)=2\pi B(k)e^{-ka_0}$, and $$\begin{cases} k_x = k\sin\zeta\cos\theta = k_1\cos\theta, \\ k_y = k\sin\zeta\sin\theta = k_1\sin\theta, \\ k_z = k\cos\zeta = \sqrt{k^2 - k_1^2} \geq 0, \end{cases} \quad (8)$$

and where $$k_1 = \sqrt{k_x^2 + k_y^2} = k\sin\zeta. \quad (9)$$

In the following discussion the relationship between the backscattered signals received from an object as a limited diffraction array beam and a 3D or 2D image reconstruction of the object is established. Although the exact array beams as set forth in equation (5) and the use of an infinite aperture are assumed in the derivation, good images may be constructed using a transducer with a finite aperture within the depth of field of the beams as set forth in Equation (2).

Figure 1:
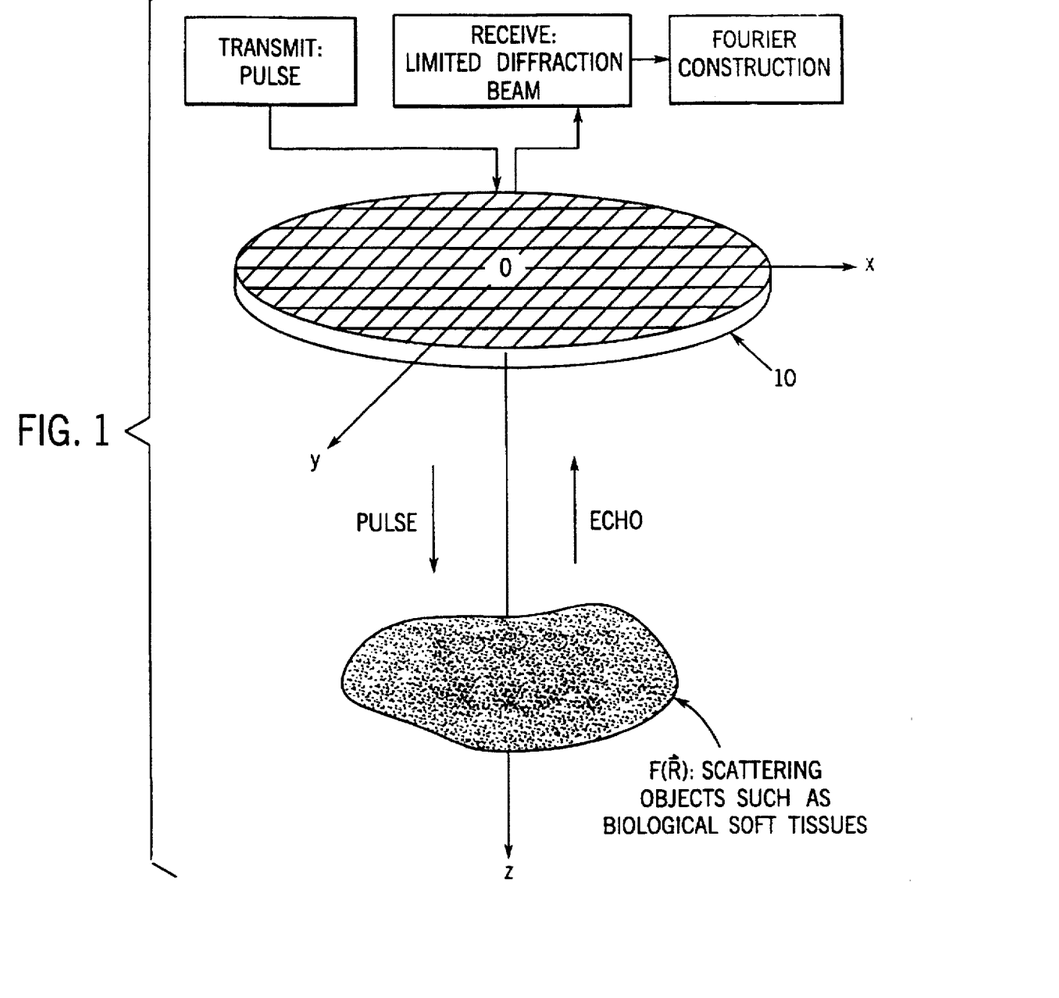
FIG. 1 is a pictorial representation of an ultrasound imager used to explain the present invention.

Referring particularly to FIG. 1, assume that a 3D object, $f(\vec{r})$ (reflection coefficient), is composed of randomly positioned point scatters embedded in a uniform background supporting a constant speed of sound. A broadband circular 2D array transducer 10 is excited to produce a plane wave pulse (broadband) that is expressed as follows:

$$P(z-ct) = \frac{1}{2\pi} \int_{-\infty}^\infty A(k) e^{ik(z-ct)} dk = \frac{1}{2\pi} \int_{-\infty}^\infty A(k) e^{ikz} e^{-i\omega t} dk, \quad (10)$$

where $$\frac{A(k) e^{ikz}}{c} \quad (11)$$

is the temporal spectrum of the plane wave pulse.

If the same array transducer 10 is used as a receiver and is weighted to produce a limited diffraction array beam response with the parameters $k_x$ and $k_y$, the received signal for the wave scattered from a point scatter located at $\vec{r}=(x,y,z)$ is given by the following convolution:

$$R^{(one)}_{k_x,k_y,k'_z}(t) = f(\vec{r})[P(z-ct) * \Phi_{Array}(\vec{r},t)] = \quad (12)$$

$$\frac{1}{2\pi} \int_{-\infty}^\infty \frac{A(k)T(k)H(k)}{c} f(\vec{r}) e^{ik_x x + ik_y y + ik'_z z} e^{-i\omega t} dk,$$

where "*" represents the convolution with respect to time and where $k'_z = k + k_z$, and the superscript "(one)" means "one point scatterer". This uses the fact that the spectrum of the convolution of two functions is equal to the product of the spectra of the functions.

Because the imaging system is linear, the received signal for echoes returned from all the scatterers within the object $f(\vec{r})$ is a linear superposition of those echo signals from individual point scatters as follows:

$$R_{k_x,k_y,k'_z}(t) = \quad (13)$$

$$\frac{1}{2\pi} \int_{-\infty}^\infty \frac{A(k)T(k)H(k)}{c} \left[ \int_V f(\vec{r}) e^{ik_x x + ik_y y + ik'_z z} d\vec{r} \right] e^{-i\omega t} dk =$$

$$\frac{1}{2\pi} \int_{-\infty}^\infty \frac{A(k)T(k)H(k)}{c} F(k_x,k_y,k'_z) e^{-i\omega t} dk.$$

The 3D Fourier transform pair in this expression is defined as follows:

$$F(k_x,k_y,k_z) = \int_V f(\vec{r}) e^{ik_x x + ik_y y + ik_z z} d\vec{r} \quad (14)$$

and $$f(\vec{r}) = \frac{1}{(2\pi)^3} \int_{-\infty}^\infty \int_{-\infty}^\infty \int_{-\infty}^\infty F(k_x,k_y,k_z) e^{-ik_x x - ik_y y - ik_z z} dk_x dk_y dk_z,$$

where V is the volume of the object $f(\vec{r})$.

From Equation (13) the temporal Fourier transform (spectrum) of the received signal is obtained:

$$\tilde{R}_{k_x,k_y,k'_z}(\omega) = \frac{A(k)T(k)H(k)}{c^2} F(k_x,k_y,k'_z) \quad (15)$$

or $$F_{BL}(k_x,k_y,k'_z) = c^2 H(k) \tilde{R}_{k_x,k_y,k'_z}(\omega),$$

where H(k) is used to indicate that only positive values of k are used, and $$F_{BL}(k_x,k_y,k_z') = A(k)T(k)F(k_x,k_y,k_z') \quad (16)$$

is a band-limited version of the spatial Fourier transform of the object function, the subscript "BL" means "band-limited", and the combined transmit and receive transfer function, A(k)T(k), of the array transducer 10 is assumed to be proportional to the following Blackman window function:

$$W(k) = \begin{cases} 0.42 - 0.5\cos\frac{\pi k}{k_0} + 0.08\cos\frac{2\pi k}{k_0}, & 0 \leq k \leq 2k_0, \\ 0, & \text{otherwise} \end{cases} \quad (17)$$

where $k_0 = 2\pi f_0/c$ and $f_0$ is the central frequency. The −6 dB bandwidth of W(k) is about 81% of its central frequency which is typical for medical ultrasound.

By taking the inverse transformation of Equation (16), an approximation of the object function can be constructed using the definition of the spatial Fourier transform in Equation (14)

$$f(\vec{r}) \approx f_{BL}(\vec{r}) \approx f_{BL}^{Part}(\vec{r}) = \frac{1}{(2\pi)^3} \int_{-\infty}^{\infty} dk_x \int_{-\infty}^{\infty} dk_y \int_{k > = \sqrt{k_x^2 + k_y^2}} dk'_z F_{BL}(k_x,k_y,k'_z) e^{-ik_x x - ik_y y - ik'_z z}, \quad (18)$$

where the first approximation is due to the finite bandwidth of received signals and the second approximation is due to the requirement that $$k > = \sqrt{k_x^2 + k_y^2}$$

must be satisfied. Thus, only part (indicated by the superscript "Part") of the spatial Fourier transform of the object function is known. It has been found that these approximations do not significantly affect the quality of constructed images.

Figure 2A:
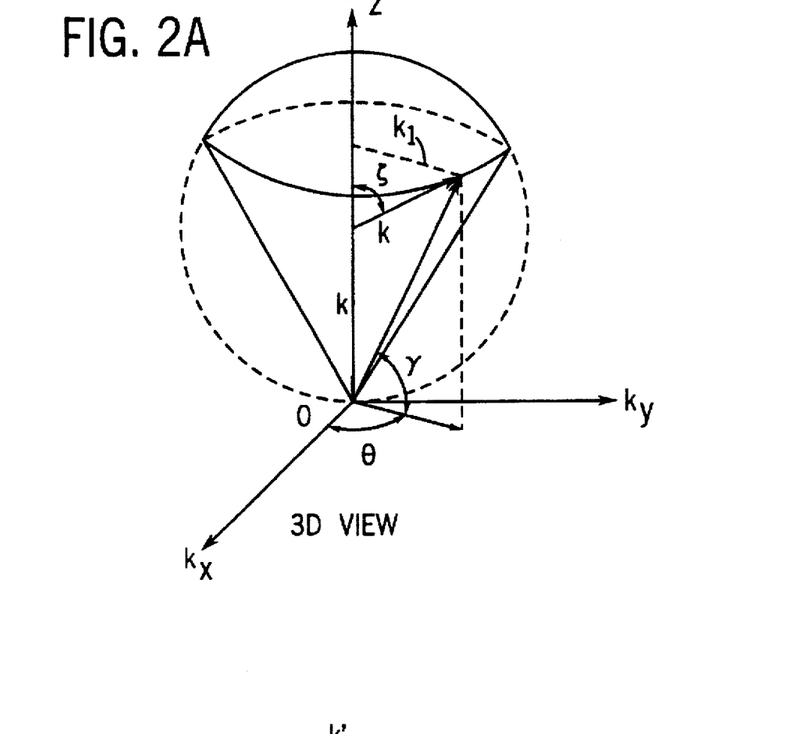
FIGS. 2a and 2b are vector representations of the k-space data acquired using the method of the present invention.

With Equation (8), the above equation (18) can be written in terms of the other set of independent variables, k, $\zeta$, and $\theta$ $$f(\vec{r}) = \frac{c^2}{(2\pi)^3} \int_0^\infty k^2 dk \int_{-\pi}^{\pi} d\theta \int_0^{\pi/2} \sin\zeta(1+\cos\zeta) d\zeta \tilde{R}_{k,\zeta,\theta}(\omega) \quad (19)$$

$$e^{-ikr\sin\zeta\cos(\phi-\theta) - ik(1+\cos\zeta)z},$$

where $\tilde{R}'_{k,\zeta,\theta}(\omega) = \tilde{R}_{k_x,k_y,k'_z}(\omega)$, $$dk_x dk_y dk'_z = \left| \frac{\partial(k_x,k_y,k'_z)}{\partial(k,\zeta,\theta)} \right| dk d\zeta d\theta, \quad (20)$$

and where $$\frac{\partial(k_x,k_y,k'_z)}{\partial(k,\zeta,\theta)} = \begin{vmatrix} \frac{\partial k_x}{\partial k} & \frac{\partial k_x}{\partial \zeta} & \frac{\partial k_x}{\partial \theta} \\ \frac{\partial k_y}{\partial k} & \frac{\partial k_y}{\partial \zeta} & \frac{\partial k_y}{\partial \theta} \\ \frac{\partial k'_z}{\partial k} & \frac{\partial k'_z}{\partial \zeta} & \frac{\partial k'_z}{\partial \theta} \end{vmatrix} = k^2 \sin\zeta(1+\cos\zeta) \quad (21)$$

is the Jacobian determinant. For a practical array transducer 10 of a finite diameter, D, the depth of field of the array beams is determined by Equation (2). If one is interested in objects within a given depth of field, $Z_{max}$, the corresponding Axicon angle, $\zeta_{max} \leq \pi/2$, can then be calculated. In this case, the integration over $\zeta$ in Equation (19) should be from 0 to $\zeta_{max}$. As shown in FIG. 2, $\zeta_{max}$ determines the maximum open angle of the spherical cone.

If the object function $f(\vec{r})$, is real, which is the case in most applications, the following is true from Equation (14):

$$F(-k_x,-k_y,-k_z') = F^*(k_x,k_y,k_z'), \quad (22)$$

where the superscript "*" means complex conjugate. In this case, the spatial Fourier transform of the object function in the lower Fourier space ($k_z' < 0$) is also known.

The above Equations (18) and (19) which define the construction of 3D images of 3D objects $f(\vec{r})$ can be simplified to 2D cases for both B-mode imaging (assuming that objects do not change in the elevation direction, y) and C-mode imaging (assuming that objects are only a thin layer located at an axial distance $z = z_0$ away from the transducer 10, where $z_0$ is a constant).

C-mode imaging assumes the object function $f(\vec{r})$ in Equation (13) represents a thin layer that is parallel to the surface of the 2D array transducer 10. This is indicated as follows:

$$f(\vec{r}) = f^{(1)}(x,y) \delta(z-z_0), \quad (23)$$

where $\delta$ is the Dirac-Delta function and $f^{(1)}(x,y)$ is a transverse object function. The received signal is then expressed as follows from Equation (13):

$$R^{(1)}_{k_x,k_y,k_z'}(t) = \frac{1}{2\pi} \int_{-\infty}^{\infty} \frac{A(k)T(k)H(k)}{c} \left[ \int_S f^{(1)}(x,y) e^{ik_x x + ik_y y} dx dy \right] e^{ik_z' z_0} e^{-i\omega t} dk = \frac{1}{2\pi} \int_{-\infty}^{\infty} \frac{A(k)T(k)H(k)}{c} F^{(1)}(k_x,k_y) e^{ik_z' z_0} e^{-i\omega t} dk, \quad (24)$$

where S is the area of the object and $F^{(1)}(k_x,k_y)$ is the spatial Fourier transform of $f^{(1)}(x,y)$. As with Equations (15) and (16), we then have:

$$F_{BL}^{(1)}(k_x,k_y) = A(k)T(k)F^{(1)}(k_x,k_y) = c^2 H(k)\tilde{R}_{k_x,k_y,k_z'}^{(1)}(\omega)e^{-ik_z'z_0}. \quad (25)$$

From Equation (25), the 2D image of the thin-layer object can be constructed approximately with the 2D spatial inverse Fourier transform as follows:

$$f^{(1)}(x,y) \approx f_{BL}^{(1)}(x,y) = \quad (26)$$

$$\frac{1}{(2\pi)^2} \int\int_{\sqrt{k_x^2+k_y^2}\,\leq\,k} F_{BL}^{(1)}(k_x,k_y)e^{ik_x x + ik_y y} dk_x dk_y.$$

Equation (26) can be evaluated by either fixing the wave number (monochromatic), $k=k_0=2\pi f_0/c$, where $f_0$ is the central temporal frequency of the pulse-echo system, or fixing the Axicon angle, $\zeta=\zeta_{max}$, and then changing $k$ (broadband). For the monochromatic case, $k=k_0$, we have $$f^{(1)}(x,y) = \frac{c^2}{(2\pi)^2} \int\int_{\sqrt{k_x^2+k_y^2}\,\leq\,k_0} \left[ \tilde{R}_{k_x,k_y,k_z'}^{(1)}(\omega_0)e^{-ik_z'z_0} \right] e^{ik_x x + ik_y y} dk_x dk_y, \quad (27)$$

where $\omega_0=k_0 c$. If $\zeta=\zeta_{max}$ is fixed, from Equation (8), we obtain $$f^{(1)}(x,y) = \frac{c^2 \sin^2\zeta_{max}}{(2\pi)^2} \cdot \int_0^\infty k\,dk \int_{-\pi}^{\pi} d\theta \left[ \tilde{R}_{k,\zeta_{max},\theta}^{(1)'}(\omega)e^{-ik(1+\cos\zeta_{max})z_0} \right] e^{-ikr\sin\zeta_{max}\cos(\Phi-\theta)}, \quad (28)$$

where $\tilde{R}_{k,\zeta,\theta}^{(1)'}(\omega)=\tilde{R}_{k_x,k_y,k_z'}^{(1)}(\omega)$.

To construct B-mode images, it is assumed that the object function $f(\vec{r})$ is given by $f(\vec{r})=f^{(2)}(x,z)$. That is, the object is uniform along the y direction. In this case, it is not necessary to weight array transducers in the y direction, and thus a 1D array transducer instead of the 2D array transducer 10 can be used.

From Equation (5), the broadband layered array beams are defined by setting the free parameter $(k_y)$ to zero, $$\Phi_{Layer}(x,z,t) = \frac{1}{2\pi} \int_{-\infty}^{\infty} T(k)H(k)e^{ik_x x + ik_z' z}e^{-i\omega t} dk, \quad (29)$$

where the subscript "Layer" represents "layered array beams", $k_z'=k+k_z$, and where $$\begin{cases} k_x = k\sin\zeta \\ k_z = \sqrt{k^2 - k_x^2} = k\cos\zeta \geq 0 \end{cases} \quad (30)$$

is a special case of Equation (8) with $\theta=0$.

From Equation (13), the resulting received signal is as follows:

$$R_{k_y,k_z'}^{(2)}(t) = \quad (31)$$

$$\frac{1}{2\pi} \int_{-\infty}^{\infty} \frac{A(k)T(k)H(k)}{c} \left[ \int\int_S f^{(2)}(x,z)e^{ik_x x + ik_z' z} dx\,dz \right] e^{-i\omega t} dk =$$

Figure 2B:
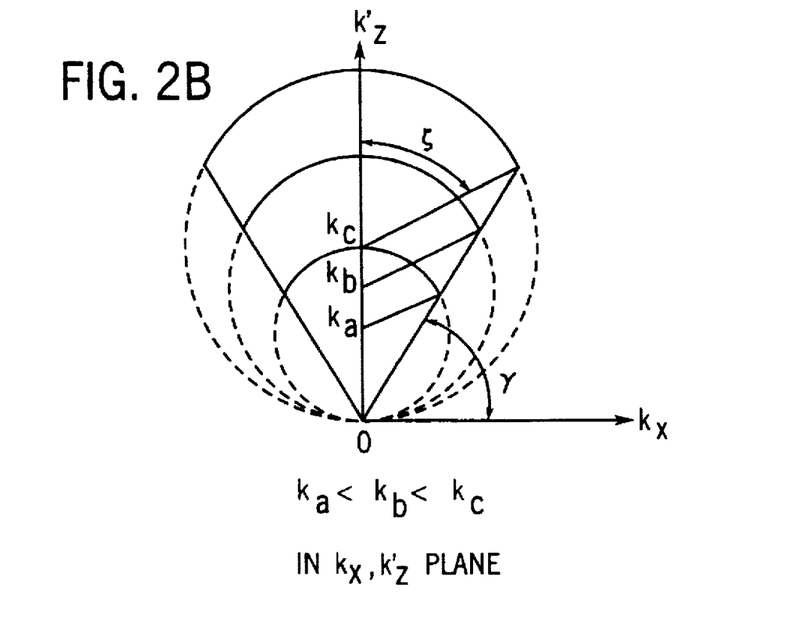

-continued $$\frac{1}{2\pi} \int_{-\infty}^{\infty} \frac{A(k)T(k)H(k)}{c} F^{(2)}(k_x,k_z')e^{-i\omega t} dk,$$

where $F^{(2)}(k_x,k_z')$ is a spatial Fourier transform of $f^{(2)}(x,z)$. [Because $k_z' \geq k(k \geq 0)$, the spatial Fourier transform of $f^{(2)}(x,z)$ is known in the area shown in FIG. 2(b).]

If $f(\vec{r})$ is also a function of y, the $f^{(2)}(x,z)$ in Equation (31) is an effective 2D object function that is given by $$f^{(2)}(x,z) = \int_{-\infty}^{\infty} f(\vec{r}) dy. \quad (32)$$

In most B-scan systems, beams are focused with a lens in the elevation direction (y direction), the slice thickness is quite small at focus and the effective 2D object function in Equation (32) can be written as follows:

$$f^{(2)}(x,z) = f(x,y_0,z)d_y \quad (33)$$

where $y_0$ is the center plane of the slice defined by the elevation focus and $d_y$ is the slice thickness.

From Equation (31), it follows:

$$F_{BL}^{(2)}(k_x,k_z')=A(k)T(k)F^{(2)}(k_x,k_z')=c^2 \tilde{R}_{k_x,k_z'}^{(2)}(\omega)H(k), \quad (34)$$

where $\tilde{R}_{k_x,k_z'}^{(2)}(\omega)$ is the temporal Fourier transform of $R_{k_x,k_z'}^{(2)}(t)$. The effective object function $f^{(2)}(x,z)$ can be constructed by inverse spatial Fourier transforming the signal of Equation (34):

$$f^{(2)}(x,z) \approx f_{BL}^{(2)}(x,z) \approx f_{BL}^{(2)Part}(x,z) = \quad (35)$$

$$\frac{1}{(2\pi)^2} \int_{-\infty}^{\infty} dk_x \int_{k\,\geq\,|k_x|} dk_z' F_{BL}^{(2)}(k_x,k_z')e^{ik_x x + ik_z' z}.$$

Using Equation (30), Equation (35) can be written as:

$$f^{(2)}(x,z) = \quad (36)$$

$$\frac{c^2}{(2\pi)^2} \int_0^\infty k\,dk \int_0^{\pi/2} d\zeta (1+\cos\zeta) \tilde{R}_{k,\zeta}^{(2)'}(\omega)e^{-ikx\sin\zeta - ik(1+\cos\zeta)z},$$

where $\tilde{R}_{k,\zeta}^{(2)'}(\omega)=\tilde{R}_{k_x,k_z'}^{(2)}(\omega)$.

DESCRIPTION OF THE PREFERRED EMBODIMENT

Figure 3:
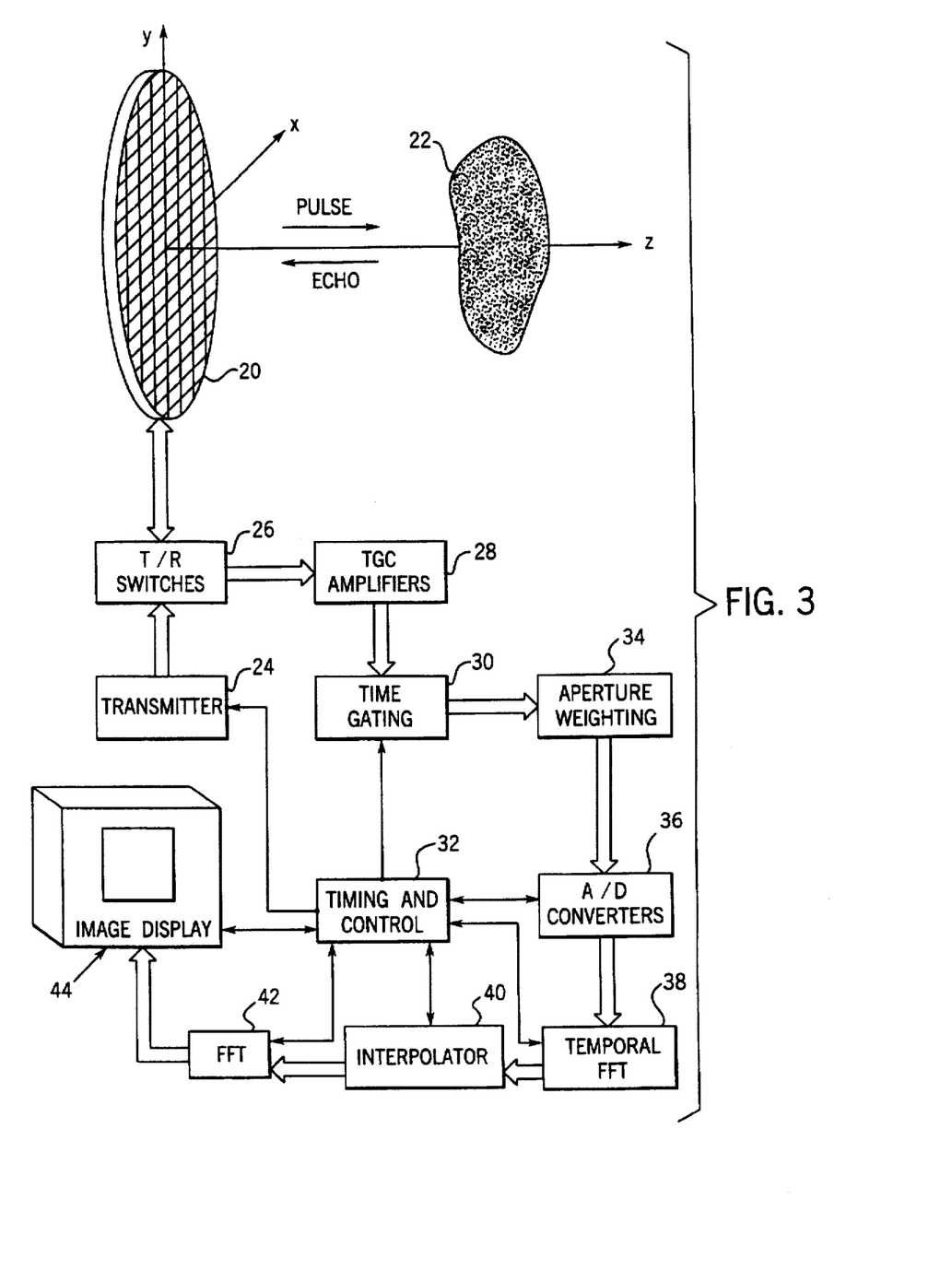
FIG. 3 is an electrical block diagram of a preferred embodiment of the invention used to produce 3D images.

Referring particularly to FIG. 3, a 3D ultrasonic imaging system includes a 2D array transducer 20 which produces a pulse having a 2.5 MHz central frequency and of approximately 81% fractional bandwidth (−6 dB bandwidth divided by the central frequency). An echo reflected from a three-dimensional object 22 is received by the transducer 20 and the resulting signals from each of its separate elements is processed as described below. The transducer 20 is a 50 by 50 element array having a diameter (D) of 50 mm and it is commercially available from Hewlett-Packard Labs. However, it is contemplated that for medical imaging, particularly of the heart, a smaller transducer ($\approx$25 mm) operating at a higher frequency (e.g. 3.5 MHz) may be used.

For 2D C-mode or 3D imaging, the inter-element distances of the transducer 20 along the x and y axes are determined by the highest spatial frequencies of $k_x$ and $k_y$, respectively. In current medical ultrasonic imaging systems, lateral resolutions are usually much lower than axial resolution, and therefore, $k_x$ and $k_y$ are allowed to be much smaller than k. For example, if $\zeta \leq \zeta_{max} = 6.6°$, then $\sqrt{k_x^2 + k_y^2} \leq k_{max} \sin \zeta_{max} = 0.115 k_{max}$, where $k_{max}$ is determined by the highest temporal frequency. This means that the inter-element distance in the 2D transducer 20 can be much larger than a fully sampled 2D array used in systems for electronic steering. Any resulting grating lobes can be suppressed by sub-dicing each transducer element as is routinely done with commercially available medical arrays. The large inter-element distance reduces dramatically the number of elements required in the transducer 20. In the preferred embodiment 1153 elements are used. However, the large inter-element distance reduces the lateral resolution at distances near the transducer surface, where $Z_{max}$ is small and $\zeta_{max}$ is large.

The 2.5 MHz pulse is generated by an R.F. transmitter 24 for a short time period. This R.F. pulse is applied through a transmit/receive ("T/R") switch 26 to all of the elements in the transducer 20. The resulting 2.5 MHz plane wave launched from the transducer 20 by this uniform pulse applied to its elements may be weighted near the edges thereof to reduce edge waves. If such weighting is used for the transmitted plane wave, the reconstructed image should be compensated by an inversion of the transmit weighting function.

The individual echo signals received by each transducer element are coupled through the T/R switches during the receive mode and applied to a TGC amplifier 28. As is well known in the art, the TGC amplifiers divide the time interval over which the echo signal is received into segments and change the amplification of the received echo signals during each time segment. More amplification is provided for later echo signal segments to compensate for the fact that they emanate from more distant reflectors and are diminished more in amplitude.

Referring still to FIG. 3, the received echo signals are then time gated by a circuit 30 which selects out only that portion of the echo signal which corresponds to the thickness ($d_z$) of the object 22. The time gating circuit 30 and the other elements in the system of FIG. 3 are controlled by a timing and control circuit 32, which will be described in more detail below. The gated echo signals at the output of the time gating circuit 30 are analog signals from each transducer element which indicate the reflections from the volume containing the object 22.

The received echo signals are weighted to produce a limited diffraction receive beam. The grid array beam defined above in Equation (5) is produced by an aperture weighting circuit 34. The weightings are simple cosine and sine functions that are approximated with piecewise steps (the step size is determined by the inter-element distance of the array transducers). The free parameters of the limited diffraction beam $k_x$ and $k_y$, are chosen so that they fall exactly at the rectangular grids of the spatial Fourier domain. The sampling intervals of $k_x$ and $k_y$ are determined by the dimensions, $d_x$ and $d_y$, of constructed images in the x and y directions, respectively, i.e., $\Delta k_x \leq 2\pi/d_x$ and $\Delta k_y \leq 2\pi/d_y$. The number of samples, $N_x$ and $N_y$ in the x and y directions, respectively, is determined by the spacing of the constructed images in the corresponding direction.

The limited diffraction beams form the separate "A-line" signals that are outputted by the circuit 34 and are digitized by A/D converters 36. This digitization is performed at a rate that satisfies the Nyquist sampling theorem, and in the preferred embodiment, this conversion is performed by 10-bit, 40 MHz A/D converters manufactured by Analog Devices.

The digitized A-line signals are each Fourier transformed by application to a corresponding set of FFT integrated circuits that form a temporal FFT circuit 38. The FFT circuits are commercially available DSP (digital signal processing) circuits such as the TMS320C30, 80, or 82 manufactured by Texas Instruments, Inc. or an application specific integrated circuit (ASIC). The output of the temporal FFT circuit 38 is a three dimensional array of k-space data which represents the subject being imaged.

The output of the FFTs 38 are applied to an interpolator 40 which transforms the k-space data to a rectilinear k-space array. Elements of the transformed k-space array ($k_x$, $k_y$, $k_z'$) are selected with nearest-neighbor interpolation using the formula $$k = \frac{k_z'^2 + k_x^2 + k_y^2}{2 k_z'}, k_z' \geq \sqrt{k_x^2 + k_y^2}, \quad (37)$$

where $k_z'$ are given at equal-distance intervals. At points where Equation (37) is not satisfied, the Fourier space is simply filled with zeroes. Similar to $k_x$ and $k_y$, the sampling interval for $k_z'$ is determined by the inversion of the thickness of constructed images, i.e., $\Delta k_z' \leq 2\pi/d_z$, and the number of samples in the z direction, $N_z$, is determined by the step size of the constructed images in this direction. Because object functions are assumed to be real, the spatial Fourier transform for $k_z' < 0$ is simply the complex conjugate of that for $k_z' \geq 0$. The formula (37) can be implemented in the interpolator 40 with a lookup table or field programmable arrays (FPGAs) to generate required k values.

After the complete spatial Fourier transform of the object is obtained on the three-dimensional rectangular grid $k_x$, $k_y$ and $k_z'$, an image can be reconstructed by performing a three-dimensional inverse Fourier transformation along each k-space data array axis $k_x$, $k_y$ and $k_z'$. This is accomplished by the IFFT (inverse fast Fourier transform) circuit 42. The resulting three-dimensional array of image data is then displayed at 44 using any one of the well-known methods.

To achieve a maximum frame rate the IFFT circuit 42 is comprised of commercially available discrete digital signal processing circuits such as the DSP circuit identified above for the FFT circuit 38.

The timing and control circuit 32 operates the above-described elements to repeatedly energize the transducer 20 and produce a plane wave directed at the object 22. The resulting echo signals are received as a limited diffraction beam and processed to produce a three-dimensional image data set. This process may be repeated at a very high rate, since unlike prior ultrasound systems, a single plane wave emission produces the limited diffraction receive beams for a complete three-dimensional image. For biological soft tissues at a depth of 200 mm, a frame rate of 3750 frames/ second is theoretically possible. In practice, the frame rate will be determined by the particular electronic circuits used. The speed of the FFT and inverse FFT circuits as well as the refresh speed of the display 44 will, in most instances, be the limiting factor. However, it is also possible with the present invention to acquire image data at the theoretically maximum frame rate and store that data for later "off-line" processing.

The high frame rate that is achievable using the present invention can also be traded off for improved image quality. For example, rather than display each frame of newly acquired data, the acquired data may be averaged over a plurality of acquisitions to improve the signal-to-noise ratio of the reconstructed image.

By employing the high frame rate capability of the present invention, 3D RF (radio frequency) data of two consecutive volumes of images can also be acquired and stored for speckle tracking analysis. This enables 3D flow vectors to be calculated, which overcomes many problems associated with conventional Doppler blood flow techniques.

The present invention also offers an opportunity to image living biological cells. By using the high imaging frame rate, the invention may be applied to acoustic microscopy for imaging of living biological cells in a high temporal resolution ("freezing" cell activities with a fast snapshot). This is not possible with conventional scanning acoustic microscopy that requires a relative long time to perform mechanical scanning. In addition, because no acoustic lens or electronic focusing is needed with the present invention, cells may be brought closer to the transducer to reduce attenuation by the coupling media so that a higher frequency can be used to achieve a higher spatial resolution without resorting to low temperature techniques.

The present invention may also be used to obtain 2D B-mode images. In this case a commercially available 1D transducer may be used in place of the 2D transducer 20 in the system of FIG. 3. The 1D transducer may focus in the y direction with a physical lens to obtain a thin slice thickness near the focus. The echo signals are weighted in the x direction to produce broadband, limited diffraction layered array beams. Equation (34) defines how to reconstruct 2D B-mode images at a high frame rate. Compared to the 3D imaging system of FIG. 3, a 2D B-mode imaging system is greatly simplified since all the electronics are scaled down by one dimension. The discussion above for the design of 2D array transducer 20 also applies to the design of a 1D transducer for 2D B-mode imaging.

Although steering is not necessary to construct either a 2D or 3D image using the present invention, the imaging system in FIG. 3 can be steered electronically to increase its field of view. In this case, the inter-element distance of the array transducer 20 in the scan direction must be smaller than or equal to $\lambda_{min}/2$ to eliminate grating lobes. In the elevation direction, the inter-element distance can still be large. Time delays required for the steering can be added in either the time domain or temporal frequency domain.

As shown in FIG. 2, only part of the spatial Fourier domain is acquired by the measured backscattered signals. Several methods can be used to increase the Fourier-domain acquisition and thereby increase image resolution and reduce side lobes. If the imaging system in FIG. 3 is rotated around the object 22, the spherical cone in FIG. 2 is rotated accordingly. Such rotations increase the Fourier-domain acquisition, but they also complicate the imaging system, reduce the system accessibility to the human body, and reduce image frame rate.

Without rotating the imaging system, a more complete spatial Fourier-domain acquisition can also be obtained by both transmitting and receiving limited diffraction beams. If the plane wave produced during the transmission mode is replaced with a limited diffraction array beam, the received signal is as follows:

$$R^{(PEa)}_{k'_x,k'_y,k'_z}(t) = \qquad (38)$$

$$\frac{1}{2\pi}\int_{-\infty}^{\infty}\frac{T^2(k)H(k)}{c}\left[\int_V f(\vec{r})e^{iK_x x + iK_y y + iK_z z}d\vec{r}\right]e^{-i\omega t}dk =$$

$$\frac{1}{2\pi}\int_{-\infty}^{\infty}\frac{T^2(k)H(k)}{c}F^{(PEa)}(k'_x,k'_y,k'_z)e^{-i\omega t}dk,$$

where the superscript "(PEa)" means "pulse-echo with array beams", $k_x'=2k_x$, $k_y'=2k_y$, and $k_z'=2k_z$. A 3D image construction is then obtained according to the following formula:

$$f(\vec{r}) \approx \frac{8c^2}{(2\pi)^3}\int_0^\infty k^2 dk \int_{-\pi}^{\pi}d\theta\int_0^{\pi/2}\sin\zeta d\zeta \tilde{R}^{(PEa)'}_{k,\zeta,\theta}(\omega) \qquad (39)$$

$$e^{-i2k r \sin\zeta\cos(\phi-\theta)-i2kz\cos\zeta},$$

where $\tilde{R}^{(PEa)'}_{k,\zeta,\theta}(\omega)=\tilde{R}_{k'_x,k'_y,k'_z}(\omega)$ is the temporal Fourier transform of equation (38), and "$\approx$" sign means approximation due to the finite temporal bandwidth of practical systems. For 2D B-mode imaging, Equations (38) and (39) can be reduced to 2D in a way similar to that discussed above for plane wave transmission. Because multiple transmits are required to implement Equations (38) and (39), image frame rate drops significantly for 3D imaging. However, for 2D B-mode imaging, the frame rate is about the same as that of current commercial B-scanners. Because of the increased coverage of the spatial Fourier domain, lateral resolution of constructed images increases and sidelobes are reduced.

We claim:

1. A method for producing an image using an imaging system, the steps comprising:
    a) transmitting a pulse of energy toward an object to be imaged;
    b) receiving echo signals from the object at separate elements of a transducer array;
    c) weighting the echo signals received at the separate elements to form limited diffraction receive beams;
    d) Fourier transforming the weighted echo signals to for a multi-dimensional k-space data set;
    e) interpolating the multi-dimensional k-space data set to produce a rectilinear multi-dimensional k-space data set;
    f) performing an inverse Fourier transformation of the interpolated k-space data set along each of its dimensions to produce an image data set; and
    g) producing an image from the image data set.

2. The method as recited in claim 1 in which the separate elements in the transducer array are arranged in a two-dimensional array, the k-space data set has three dimensions, and the inverse Fourier transformation is performed along each of the three dimensions to produce a three-dimensional image data set.

3. The method as recited in claim 1 in which the pulse of energy is transmitted using the separate elements of the transducer array, and the transmissions of each separate element are weighted to produce a limited diffraction beam.

4. The method of claim 1 which further includes the step of time gating the received echo signals.

5. The method of claim 1 which includes digitizing the weighted echo signals prior to Fourier transforming them.

6. The method of claim 1 in which the pulse of energy is an ultrasonic plane wave.

7. The method of claim 6 in which the transducer array is used to produce the plane wave by energizing its separate elements in a similar manner.

8. The method as recited in claim 1 in which both the transmitted pulse of energy and the limited diffraction receive beam are steered.

9. The method as recited in claim 1 in which steps a) through f) are repeated and both the transmitted pulse of energy and the limited diffraction receive beams are steered in a different direction toward the object.

10. The method as recited in claim 9 in which the steering is performed electronically.

11. The method as recited in claim 1 in which steps a)–c) are performed a plurality of times and the steps include combining the corresponding plurality of limited diffraction receive beams to increase the signal-to-noise ratio of the image.

12. The method as recited in claim 11 in which the combining step is performed before step d).

13. The method as recited in claim 11 in which the combining step is performed after step f).

14. The method as recited in claim 11 in which the combining step is performed coherently.

15. The method as recited in claim 11 in which the combining step is performed incoherently.

16. The method as recited in claim 1 in which the transformations performed in steps d) and f) are fast Fourier transformations.

* * * * *

UNITED STATES PATENT AND TRADEMARK OFFICE
CERTIFICATE OF CORRECTION

PATENT NO. : 5,720,708
DATED : February 24, 1998
INVENTOR(S) : Lu, et al.

It is certified that error appears in the above-identified patent and that said Letters Patent is hereby corrected as shown below:

Column 1,
Between lines 8 and 9, directly above "BACKGROUND OF THE INVENTION" please insert the following: under a separate heading of "Government License Rights"

"The U.S. Government has a paid-up license in this invention and the right in limited circumstances to require the patent owner to license others on reasonable terms as provided for by the terms of CA-54212 awarded by the National Institutes of Health."

Signed and Sealed this

Twenty-eighth Day of August, 2001

*Attest:*

NICHOLAS P. GODICI
*Attesting Officer*     *Acting Director of the United States Patent and Trademark Office*